(12) United States Patent
Gormish

(10) Patent No.: US 7,660,473 B2
(45) Date of Patent: Feb. 9, 2010

(54) ERROR CONCEALMENT USING ICONS FOR JPEG AND JPEG 2000 COMPRESSED IMAGES

(75) Inventor: Michael J. Gormish, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 618 days.

(21) Appl. No.: 10/286,115

(22) Filed: Nov. 1, 2002

(65) Prior Publication Data

US 2004/0088302 A1 May 6, 2004

(51) Int. Cl.
*G06K 9/36* (2006.01)
(52) U.S. Cl. .................. 382/235; 382/233; 382/240
(58) Field of Classification Search ......... 382/162–167, 382/298, 299, 120, 302, 232, 233, 235, 240, 382/244; 375/240.27; 707/100; 714/758
See application file for complete search history.

(56) References Cited

U.S. PATENT DOCUMENTS 5,659,654 A * 8/1997 Nagasawa et al. ........... 386/120

FOREIGN PATENT DOCUMENTS

| JP | 10-056563 | 2/1998 |
|----|-----------|--------|
| JP | 2001-157063 | 6/2001 |

OTHER PUBLICATIONS

Wang et al. ("Error Control and Concealment for Video Communication: A Review", IEEE, vol. 86, No. 5, May 1998, pp. 974-997).*
Japanese Office Action dated Apr. 23, 2008; JP Patent Application No. JP2003-371937 (1 pg.).

* cited by examiner

*Primary Examiner*—Duy M Dang
(74) *Attorney, Agent, or Firm*—Blakely, Sokoloff, Taylor & Zafman LLP

(57) ABSTRACT

A method and apparatus for concealing errors using lower resolution images for compressed images is described. In one embodiment, the method comprises receiving a codestream data of an image and determining a location of an error region in coefficients using an icon.

39 Claims, 8 Drawing Sheets
(2 of 8 Drawing Sheet(s) Filed in Color)

ERROR CONCEALMENT USING ICONS FOR JPEG AND JPEG 2000 COMPRESSED IMAGES

FIELD OF THE INVENTION

The present invention relates to the field of image processing; more particularly, the present invention relates to concealing errors in decoded images using icons of the compressed images.

BACKGROUND OF THE INVENTION

Image compression makes digital cameras and image communication in general viable. Image compression also makes the effects of errors much greater. Instead of a one bit error changing only one pixel in the image, a one bit error in a compressed file can cause loss of synchronization and thus destroy the usefulness of all data past the location of the error.

Compression algorithms sometimes have special design provisions to deal with errors. The G3 fax standard "restarts" every few lines, so an error could effect at most a few lines. JPEG has "restart markers" which allow the bitstream to be resynchronized. JPEG 2000 has a variety of options to increase the ability to detect errors and thus limit the propagation effects.

Special features of the compression standard to deal with errors are often not used. Use of additional redundancy to allow error detection or correction tends to increase the bitrate, which many find undesirable. Further, most transport protocols effectively provide an error free channel by detecting errors and requesting retransmission. The error protection is thus wasted.

Unfortunately errors still do occur. JPEG images with large errors typically have an appearance as shown in FIG. 1, represented schematically in FIG. 2. The first region before any errors have occurred in the codestream appears correctly. Then the "Error Region" begins which may be a solid color band, or an area with high amounts of visible noise. Eventually a good decoder resynchronizes with the codestream and produces recognizable image data as in Region 2. Unfortunately, although the decoder resynchronized the beginning of blocks in the codestream, the position in the decoded image is wrong. This leads to a large horizontal line where the 2nd region has been shifted from the first region. It also leads to a vertical line artifact where the right edge of the picture is. Because Region 2 is shifted the left and right edges of the correct image are displayed next to each other in the visible portion of the image. In addition to the artifacts caused by the shifting of the image, the color of the image is typically wrong in Region 2. It is either brighter or darker than equivalent colors in Region 1, and there is usually some color shift as well. Images with more than one large error simply have an additional error region, and an additional visible horizontal and vertical line and intensity shift. This is shown in FIG. 3. In this case, the second error region wraps around the edge of the displayed image.

Today, most "JPEG" images contain more information than the JPEG codestreams. The original JPEG committee did not define a complete "file format," and thus a couple of variants have developed. "JFIF" and "Exif" are the two most common types of JPEG files. Both allow definition of a color space, storage of meta-data, and storage of an icon.

The Design Rule for Camera File System (DCF) is a standard that goes even further by requiring JPEG files to be in Exif format and by requiring a 160 by 120 icon. See Japan Electronic Industry Development Association (JEIDA), Design Rule for Camera File System (DCF), adopted December 1998. Also see Japan Electronic Industry Development Association (JEIDA), Digital Still Camera Image File Format Standard (Exchangeable image file format for Digital Still Cameras: Exif), Version 2.1, Jun. 12, 1998.

There has been a lot of work on error detection, correction, and or concealment with JPEG and MPEG. Some of the work with JPEG images includes the use of differences between lines (along the 8×8 block boundary) to detect errors. Prior art JPEG methods have been described that use differences between rows of blocks to determine the correct DC values, while the work with MPEG sequences includes filling in regions with errors using previous frames. Also MPEG and JPEG share the use of 8×8 block DCTs and Huffman coding. A summary of MPEG methods appears in Yao Wang and Qin-Fan Zhu, "Error Control and Concealment for Video Communications: A Review," Proceedings of the IEEE, May 1998 Vol. 86, No. 5, pp. 974-997.

All work with JPEG 2000 has involved using the error resilience tools designed in the standard. There has also been work using the error resilience tools designed into the JPEG 2000 Standard.

SUMMARY OF THE INVENTION

A method and apparatus for concealing errors using lower resolution images for compressed images is described. In one embodiment, the method comprises receiving a codestream data of an image and determining a location of an error region in coefficients using an icon.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The patent or application file contains at least one drawing executed in color. Copies of this patent or patent publication with color drawing(s) will be provided by the U.S. Patent and Trademark Office upon request and payment of the necessary fee.

DETAILED DESCRIPTION OF THE PRESENT INVENTION

Figure 1:
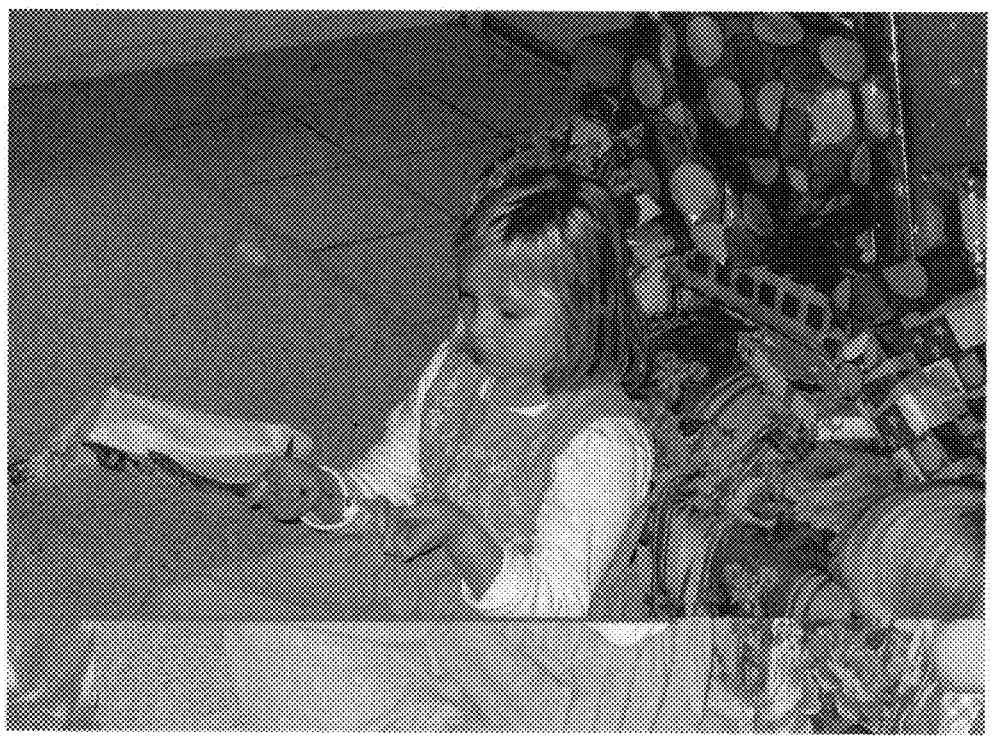
FIG. 1 illustrates a JPEG image with errors.
Figure 2:
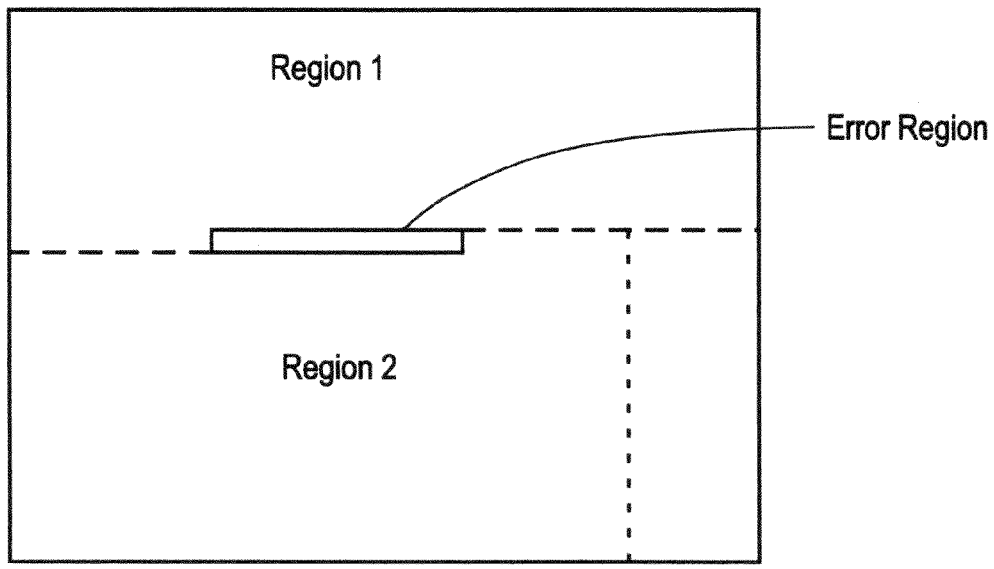
FIG. 2 illustrates regions in an image with errors.
Figure 3:
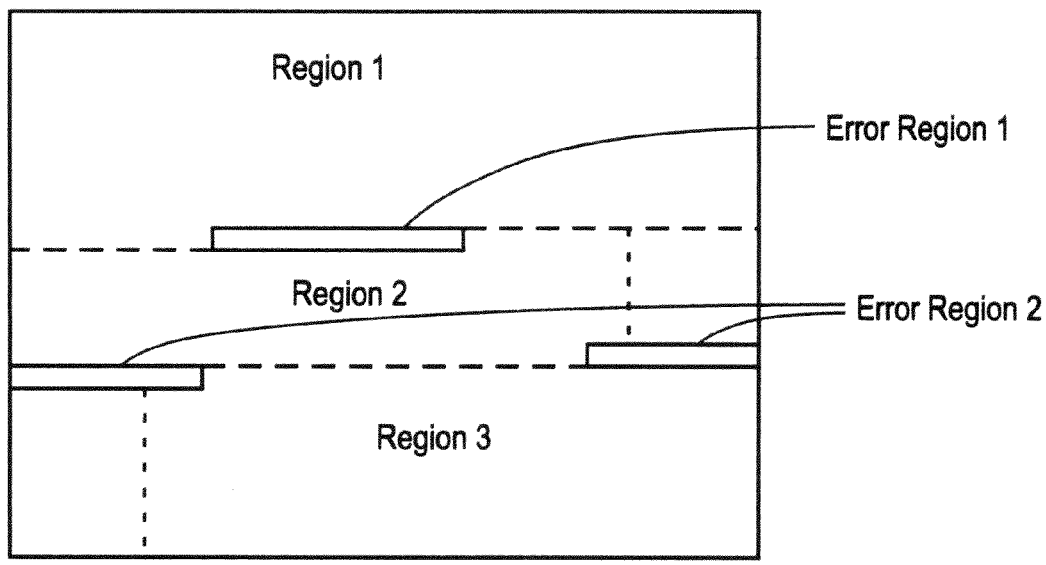
FIG. 3 illustrates regions in an image with multiple errors.

Short errors (even one bit) in a compressed file can lead to loss of the total file. Techniques are described herein to recover useful data in a compressed image and to hide portions of the image where correct data cannot be recovered. These techniques may use icons or other lower resolution images to facilitate the error detection and concealment process. In one embodiment, these techniques assume an uncorrupted low resolution version of the image (e.g., an icon) is available. These images (e.g., icons) are typically present in Exif or JFIF format JPEG files. The images (e.g., icons) may also be available from other sources (e.g., an image database might have generated icons for browsing prior to corruption).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Error Concealment with Icons for JPEG Images

The following techniques may be used to conceal errors in a decoded JPEG image. In one embodiment, this technique assumes that the header information (e.g., quantization tables and Huffman tables) is received without error and also assumes that a small image such as a lower resolution image (e.g., icon) for the decoded image with the errors is available. The header information may include the image size information for use in determining the size of the image. The quantization tables contain a reconstruction multiplier for the DCT coefficients. Alternatively, one could determine what the values in the quantization table should be from similar files coded with the same system. Note the Huffman tables may only be necessary if default Huffman tables are not used. In one embodiment, the lower resolution image (e.g., icon) can come from an Exif or JFIF header, or some other source. Thus, the technique described herein needs access to parameters of the decoding process.

Importantly, the techniques described herein operate regardless of whether or not restart markers have been used in the compressed file.

In one embodiment, the techniques described herein fix one error in the codestream where that error could be one bit or several thousand bytes long. In the event of a few errors, images can be corrected by slight modification of the techniques to fix the first error, and then repeating the technique to correct the second and subsequent errors through an iterative process.

For the remainder of the description, the terms "lower resolution image" and "icon" will be used interchangeably.

Figure 4:
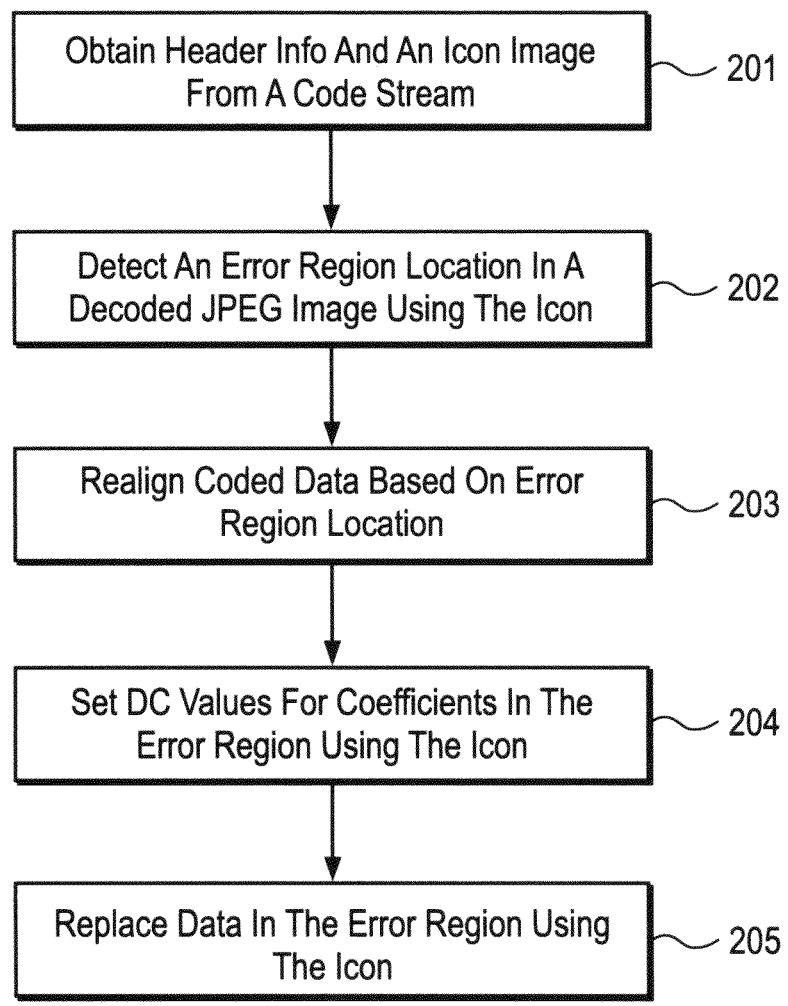
FIG. 4 is a flow diagram of one embodiment of a JPEG error concealment process.

FIG. 4 is an illustration of a JPEG error concealment process. The process is performed by processing logic that may comprise hardware (e.g., circuitry, dedicated logic, etc.), software (such as is run on a general purpose computer system or a dedicated machine), or a combination of both.

Referring to FIG. 4, the process for concealing one or more errors in a codestream of a JPEG image to be displayed begins with processing logic obtaining header information and an icon image from the codestream (processing block 201). Once the header information and the icon image have been obtained, processing logic detects a location of an error region in a decoded JPEG image using the icon or by detecting patterns in coded data (e.g., runs of "zeros" or by seeing how far decoding has taken place) (processing block 202) and realigns coded data based on the location of the error region (processing block 203). Then processing logic sets DC values for coefficients in an error region defined by the errors using the icon (processing block 204) and replaces data in the error region with alternative data using the icon (processing block 205).

Error Detection and Location Determination

In the case of errors due to file transfers, such as, for example, a low battery USB file transfer, each of the error images may have long strings of zero bytes instead of coded data. In such a case, detecting the error location is trivial as two or more bytes of zeros are almost certainly an error. When similar errors are caused by a lost packet, the location is well known at least at the transport layer. For example, in UDP since each packet may have a sequence number, if a packet within a particular sequence number in a series has not been received, the transport layer knows that one packet is missing.

In one embodiment, determining the error region and alignment in JPEG is performed by processing logic according to the following description. Note that the processing logic may comprise hardware (e.g., circuitry, dedicated logic, etc.), software (such as is run on a general purpose computer system or a dedicated machine), or a combination of both.

First, processing logic obtains Differential DC (DDC) values from the full image. Every 8×8 block in the error codestream begins with a DC value which has been encoded by subtracting the previous block's DC value and then Huffman coding the difference. Performing a normal JPEG decoding operation on an error codestream yields these differential DC values at some internal stage of the coder. These should be saved in a list. This list may have substantially more or substantially fewer DC values than the number of 8×8 blocks in the image because the errors may have lead to insertion or deletion of codeblocks.

Second, processing logic determines the equivalent DDC values for the icon image. The decoded icon image can be scaled to the size of the full image by standard interpolation methods (e.g., pixel replication, or bilinear interpolation). The scaled icon should be compressed using the same quantization table as was used to compress the error codestream. The compressed scaled icon can be decoded in the same manner as the first step yielding a list of DDC values for the icon. While the description above made use of the scaled icon, it is possible to do all of the operations without actually creating the scaled icon image. To do so, DC values for each 8×8 block in a full sized image are determined without computing the rest of the samples in the 8×8 block by simple interpolation from the icon. This can reduce memory and computational requirements of the error concealment technique.

Third, processing logic determines the spatial shifts of the error regions by comparing DDC values. To determine the spatial shifts of the error regions by comparing differential DC values, let $I(b)$ be the differential DC value of the bth block of the scaled icon image, let $E(b)$ be the differential DC value of the error image, and let $M(s)$ be the average absolute error between the signals when the error signal is shifted by s. That is:

$$M(s)=1/N\ \mathrm{SUM}(abs(I(b)-E(b-s)))$$

where the sum is over all samples which overlap after shifting, and N is the number of sample which overlap.

Figure 5:
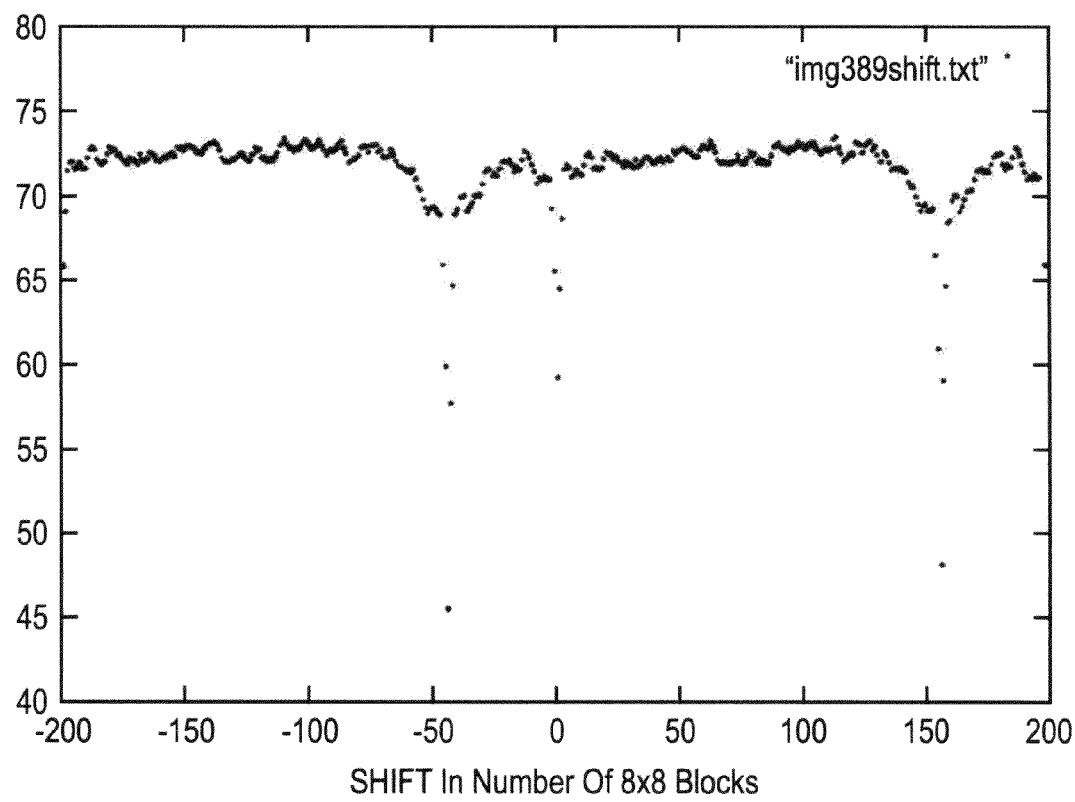
FIG. 5 illustrates error between full image and icon at various shifts.

A typical graph of $M(s)$ is shown in FIG. 5. The local minimums in $M(s)$ indicate the amount of shift caused by errors in the compressed data. Typically, there is a minimum at s=0 because the error is usually not at the very beginning of the codestream, and thus some of the codestream lines up correctly. There are also typically repeated local minimums corresponding to the number of 8×8 blocks in the width of the image. This occurs because the DC values are typically similar to the ones above and below. If there is only one error, there should be only two primary local minimums one at s=0 and one at the shift that aligns the rest of the image. Each additional error will lead to a new local minimum.

In FIG. 5, there is a local minimum at shifts of −44, 0, and 156, less visible are the mimimus at −200 and +200. Because the image used is 1600 pixels wide, which corresponds to 200 8×8 blocks, shifts that differ by 200 yield the same horizontal positioning and differ only in vertical positioning. Of the minimums at −200, 0, and +200, the minimum at 0 is the lowest and thus the correct shift for one region. Of the minimums at −44 and +156, the minimum at −44 is lower and thus the correct shift for a second region.

In one embodiment, instead of comparing DC values of the full image with DC value of the icon to determine shifts, the full image is compared with itself at various shifts. This comparison computes error in the pixel domain across 8×8 block boundaries. It is likely to be computationally more intensive than the method described above, but doesn't depend on an icon.

Fourth, processing logic declares each 8×8 block of the full sized image as matching an aligned portion of the error image or being in error. In order to compare scaled icon DDC values with aligned error image DDC values, processing logic computes how well the different shifts of the full image match at each location of the icon image using the following equations:

$$M1(b)=(I(b)-E(b-s1))^2$$

$$M2(b)=(I(b)-E(b-s2))^2$$

M1 and M2 indicate how well different shifts of the image match with the scaled icon. Since s1 is assumed to be the shift for the first portion of the image and s2 for the second portion, processing logic determines the cumulative error caused by using the error image with shift s1 up to position t, and then the error image with shift s2 beyond position t. This can be done by defining the cumulative error going forward for shift s1 and backward for shift s2 according to the following:

$$C1(t)=\sum_{i=0}^{t} M1(t)$$

$$C2(t)=\sum_{i=t}^{end} M2(i)$$

The value of t that minimizes the sum of C1(t)+C2(t) is taken as an estimate of the location of the error region and the 8×8 block to change from using one shift to another. This estimate is sufficient for computing the correct DC offset to use after the error. If the icon is large (e.g., ⅛×⅛ of the full image or bigger), then it may locate the error in the image accurately. If the icon is small (e.g., ¹⁄₁₀×¹⁄₁₀ of the image), this method is often off by one 8×8 block vertically and is thus insufficiently accurate to determine which portion of the image to fill in. In this case, the method of error detection using the high resolution image is used.

There is a fair amount of prior art on error detection by adding synchronization symbols or forward error correction. These methods only work when the encoder can be controlled. Mitchell and Tabatabai detect an error in a single coefficient by comparing the edges of an 8×8 block with the neighboring blocks and assuming the transition between blocks is smooth. (See O. R. Mitchell and A. J. Tabatabai, "Channel error recovery for transform image coding," IEEE Trans. Commun., vol. COM-29, pp. 1754,1762, December 1981, which is incorporated herein by reference.) This method is good for detecting and then correcting very small errors, but is less effective (and overly complex when very large errors occur).

A simple method to detect the error region is to compare the pixels at the bottom of one 8×8 row of blocks with the pixels at the top of the next row. The error between rows of blocks will jump by much more than the standard deviation of the samples at the row where the error occurs.

Fifth, processing logic adjusts the DC value of the full image to match the icon's DC value. In order to adjust the DC value of the full image to match the DC value of the icon, processing logic has each region of the corrected image receive pixel data from a different place. The first region can be decoded normally until the first error. The error region is skipped initially; it is useful to wait to fill in this region until the region after the error has been filled in. The region after the error is filled in by decoding and shifting the blocks spatially by the amount determined previously. The absolute DC values for all the color components (typically Y, Cb, and Cr) are also determined. This can be done by determining the overall average DC value for blocks in the region in both the error image and the DC image.

The average Luminance DC value in the error image assuming the previous absolute DC value was 0 is given by:

$$O_y = \frac{1}{t2-t1} \sum_{b=t1}^{t2} E(b-s2)$$

Identical equations apply for Cb and Cr components by summing those differential DC values. The average Luminance DC value in the icon image is given by:

$$A_y = \frac{1}{t2-t1} \sum_{b=t1}^{t2} DC(b)$$

This value is not a differential value. Thus, the correct image obtains the same average DC value in this region. To do this, the corrected image should simply use Ay−Oy as the previous DC values, and apply the differences decoded from the shifted codestream as usual for JPEG decoding.

Sixth, processing logic fills in blocks declared as errors from the scaled icon. In order to fill in blocks declared as errors from the scaled icon, processing logic may use many methods to fill in the blocks declared to be in error. Some are discussed in the survey paper by Wang and Zhu, "Error Control and Concealment for Video Communications: A Review," Proceedings of the IEEE, May 1998 Vol. 86, No. 5, pp. 974-997. In the case where the icon is available, the simplest method is to copy the error region from the scaled version of the icon. While copying from the icon will yield an accurate replacement for the DC values, the filled in region will not contain any high frequency content. Thus, other techniques for filling in the error region can be used in combination with copying. Techniques that determine the value to fill in the frequency domain can easily be combined by using only the non DC values in the 8×8 blocks.

It may happen that the error location is unknown. In this case, the low resolution icon can be expanded to the resolution of the high resolution JPEG image and a comparison made. In one embodiment, the location of the first error is determined by the beginning of a high error region when the image is viewed in terms of 8×8 blocks in raster scan order, and a comparison is made between an expanded icon and a JPEG image to identify when there are differences in the low frequency areas. The error for each 8×8 block will be low in the error free region and much higher elsewhere. Note that there will be difference in the high frequency between the two images, but this is not indicative of an error. Thus, error location may be determined by looking at the low frequency portion of the two images.

Alternatively, instead of expanding the icon, the JPEG image could be reduced in resolution and compared to the icon.

FIG. 1 shows an image as decoded by the Independent JPEG Group (IJG) JPEG codec. It is apparent visually where the problem begins, and that there is additional data available on the bottom.

Realignment Of Coded Data

Once the starting location of the error is known, one or more bytes can be added or subtracted. In one embodiment, given the starting location of an error, '0' bytes can be added or subtracted until the codec finishes decoding at the correct location (e.g., the next restart marker). For images without restart markers to finish decoding means decoding to the end of the codestream. For images with restart markers, the image can be decoded until the next restart marker. In one embodiment, bytes may be added or subtracted and a search may be performed to find the number of bytes to add to so that an IJG codec reports neither "unexpected end of image" or "nnn bytes of data past end of image". More specifically, in one embodiment, at the end of decoding, the decoder may indicate it has a number of extra bytes. In response to this indication, the same number of bytes would be subtracted. Thereafter, the decoder may finish decoding compressed bytes without creating a full size image. In response, the number of bytes to subtract may be reduced based on how many bytes were missing in this codestream. When the decoder no longer indicates there were extra bytes or missing bytes, the correct amount of added or subtracted bytes has been reached.

In another embodiment, the number of code blocks correctly decoded after the error is counted. This number can be used to correctly position the first blocks of data after the error. This works because the decoder knows what size the image should be and knows if more codeblocks have been decoded than are needed for this size image. In essence, the position in the temporary buffer where the decoded data is being stored and the change are computed by moving the buffering pointer to the end. In this case, the coded data would only need to be decoded once.

Determination of the DC Values

After the image data has been correctly located, the DC values are determined. The DC value decoded for each 8×8 block will be wrong after an error. This problem occurs because JPEG codes the DC value differentially from one codeblock to the next. When errors in the codestream change a DC value, all values to the end will be wrong.

In one embodiment, an IJG decoder is modified to allow the DC value to be set to particular value at a particular location. When the decoder is run, the starting DC value of the Y component is adjusted after the error until the MSE between the decoded image and the enlarged icon is reduced, and potentially minimized, for the Y component. The comparison may be made between average gray values of the icon and the decoded image. Then the process is repeated for the U and V components.

Alternatively, the Y, U, and V components could be done at the same time, since they are independent (prior to being transformed back into RGB space).

In another embodiment, the difference in the DC value in the error region of the image and the icon is measured. The DC value at the beginning of this region is set to reduce, and potentially minimize, the difference.

Filling in the "Missing" Portions

After the DC value has been adjusted, data for the bytes that were lost or converted to zero must be filled in. This appears as a horizontal stripe in the image in FIG. 1. The location of this bad data is known because the error has already been located.

There are several well-known techniques for "region growing" or estimation of the missing data either from nearby pixels or DCT coefficients. Note these methods could be used or a combination of methods could be used (e.g., average of the above method and another method).

In one embodiment, the missing data is replaced with data scaled from the low resolution icon. The copy and paste can be done by hand or automatically once the location of where to start and stop the copy has been made. In this case, the icon is scaled to full size and the same region from the icon is pasted over the image. An error in this subjective part may occur, such as a vertical line at the top of the image not being replaced. In one embodiment, knowledge of both the error location and when the decoding process get back in alignment allow for copying to be performed from the icon (between those points).

If this technique described above is used, the resulting image should have almost no detectable errors. At full resolution, it may be possible to notice a slight blurring where the low resolution data has been used. This could be improved by combining information from the icon with some method of prediction of the middle frequencies from the surrounding data, using well-known techniques. In any case, the fixed image is an improvement over the unmodified image.

Error Concealment with Icons for JPEG 2000 Images

JPEG 2000 has very different properties than the DCT-based original JPEG. In theory, icons are unneeded because a 1600×1200 image with 5 levels of wavelet transform has an 50×38 lowpass subband, which could be used as an icon. One or two levels of wavelet transform could be done to provide 100×75 or 200×150 images. However, when legacy systems are updated to use JPEG 2000, they may still use Exif and DCF and, thus, provide a separately coded icon. Some systems may depend on an icon that is exactly 160×120 not 100×75 or 200×150. Operating systems or image browsing programs may create their own independently coded icons. Thus, the situation with an uncorrupted icon, but a corrupt image may still occur.

Using an independently coded icon provides a simple way to conceal errors in the JPEG 2000 file.

Figure 6:
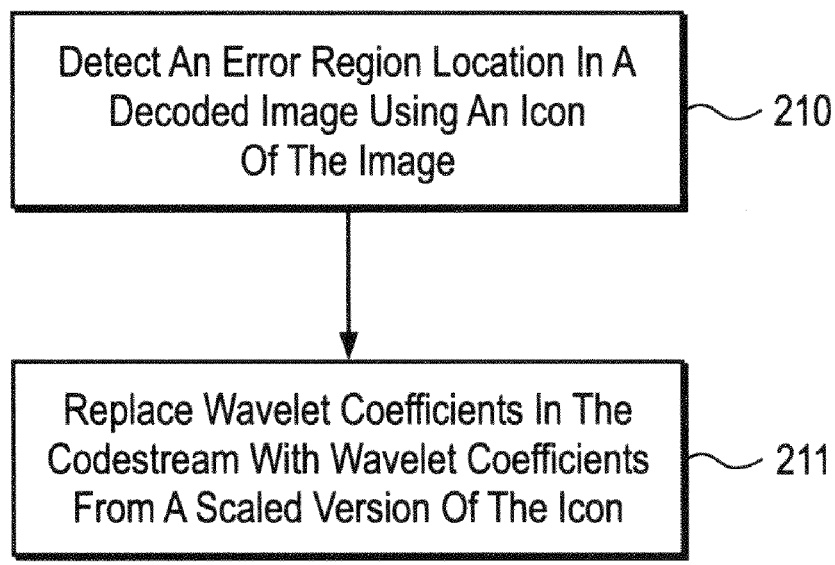
FIG. 6 is a flow diagram of one embodiment of a JPEG 2000 error concealment process.

FIG. 6 is an illustration of a JPEG 2000 error concealment process. The process is performed by processing logic that may comprise hardware (e.g., circuitry, dedicated logic, etc.), software (such as is run on a general purpose computer system or a dedicated machine), or a combination of both.

Referring to FIG. 6, the process for concealing one or more errors in a codestream of a JPEG 2000 image to be displayed begins with processing logic detecting a location of an error region in a decoded image using an icon from the codestream from which the decoded image was generated (processing block 210). Then processing logic replaces wavelet coefficients in the codestream with wavelet coefficients from a scaled version of the icon (processing block 211).

Determine Error Location

For any given system (e.g., a camera with a 1600×1200 image and a 160×120 icon at medium high compression), typical similarities between the wavelet coefficients from the original image and those from the icon may be determined. The icon can be expanded to the same resolution as the decoded image and coefficients in the expanded icon can be compared to those in the corrupted images' coefficients. For the low frequency subbands, this match should be very close, and for high frequency subbands (where the icon has no data) there is likely no match at all. If an error occurs in subbands more than twice as large as the icon, it will probably not be detectable using the icon.

If the wavelet coefficients from a scaled icon differ significantly for any code block, an error can be declared for that code block. Further, if there is an error in a packet header and synchronization is lost, the whole subband (or precinct) can be declared in error. If there is an error in the packet header which causes loss of sync, the whole subband must be replaced. If the header appears error free, then the coefficients are examined for errors.

In one embodiment, the icon is not expanded to the full size of the original image and compressed. A smaller expansion could be done and only the lower frequencies of the wavelet transform compared. This would save computation time and memory. However, in the case of image compressed with image offsets, it is important to adjust the phase of the wavelet transform so the phase of the expanded icon matches the original compressed image; otherwise false error detection will likely occur.

Replace Coded Data with Data from Icon

In the event of an error, data can be replaced on a code block by code block basis with data from the scaled icon. If this is done on a compressed codestream, packet headers will have to be rewritten to create a legal JPEG 2000 codestream for a simple (non-error resilient) JPEG 2000 decoder. For the case of loss of an entire packet, the packet from the low resolution image can be used.

Figure 7:
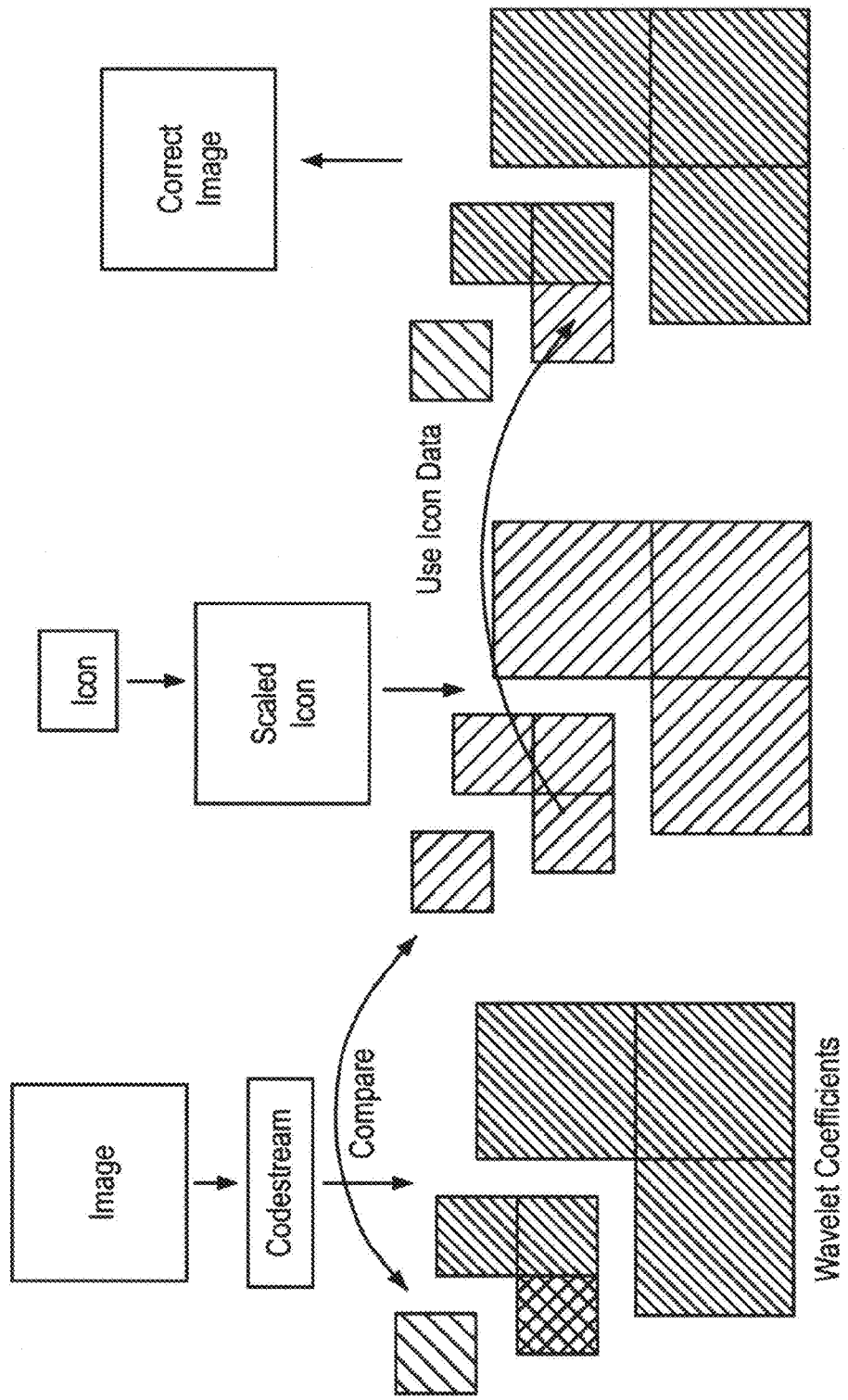
FIG. 7 illustrates a process replacing data in the decoded image with data from a scaled version of an icon.

This process is shown in FIG. 7.

AN EXAMPLE

Figure 8:
FIG. 8 illustrates an image created by compressing an image with JPEG 2000, changing the first byte of the low pass coded data to 0x00 and decoding with a JPEG 2000 codec.

The image in FIG. 8 was created by compressing an image with JPEG 2000, changing the first byte of the lowpass coded data to 0×00, and decoding the codestream with the changed data with a JPEG 2000 codec. In this case, there were enough levels of wavelet transform that the LL subband fit in a single codeblock, thus the errors affect the entire image. If there were fewer levels of wavelet transform, or a higher level subband contained the error, the effect would be more localized.

Figure 9:
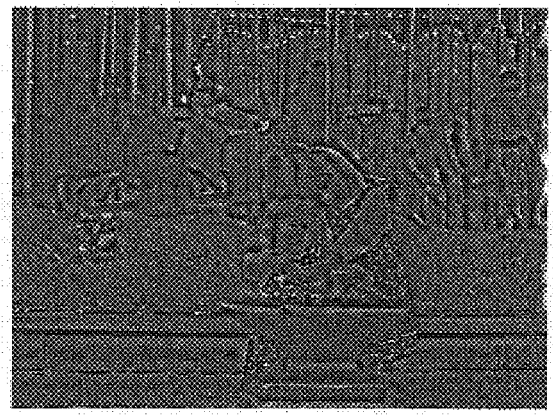
FIG. 9 illustrates the results of detecting an error in the low pass subband and replacing effected wavelet coefficients with a constant value.

If the error resilience techniques from JPEG 2000 were used by the compressor (e.g., termination on every coding pass), it might be possible to detect the error in the LL subband and replace all effected wavelet coefficients with the least objectionable value, namely '0', or some other predefined values. FIG. 9 illustrates such an image.

Figure 10:
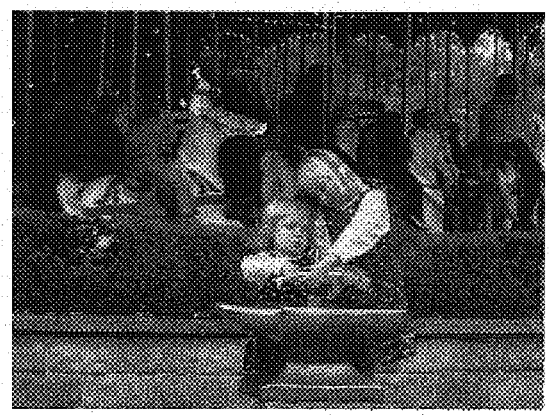
FIG. 10 illustrates the result of detecting an error in the lowpass subband and replacing effected wavelet coefficients with a value generated from an icon.

Instead, the complete lowpass subband can be replaced with the lowpass subband created by scaling an icon to full size and compressed in the same way as the original image was compressed. The image in FIG. 10 illustrates such an image. This image even printed at full size, looks every bit as good as an original. (In terms of MSE, the error is relatively high, but this is an example of a case where MSE is a very poor measure of the human response to image quality).

An Exemplary Computer System

Figure 11:
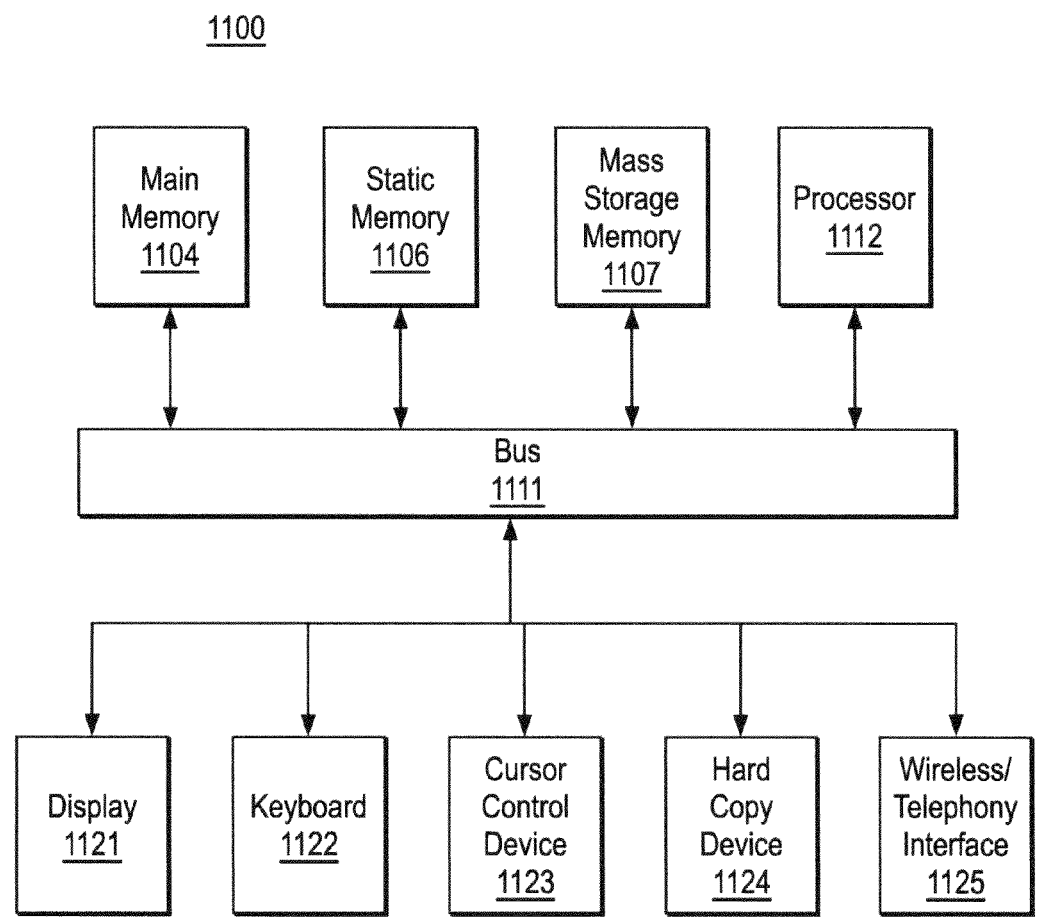
FIG. 11 is a block diagram of an exemplary computer system.

FIG. 11 is a block diagram of an exemplary computer system that may perform one or more of the operations described herein. Referring to FIG. 11, computer system 1100 may comprise an exemplary client 1150 or server 1100 computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium™, PowerPC™, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for printing instructions, data, or other information on a medium such as paper, film, or similar types of media. Furthermore, a sound recording and playback device, such as a speaker and/or microphone may optionally be coupled to bus 1111 for audio interfacing with computer system 1100. Another device that may be coupled to bus 1111 is a wired/wireless communication capability 1125 to communication to a phone or handheld palm device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
receiving, by the processor, a codestream of compressed data of an image; and
determining, by the processor, a location of an error region in coefficients in the codestream using an icon, the icon being a separate and uncorrupted lower resolution version of the image as a whole.

2. The method defined in claim 1 further comprising obtaining the icon from the codestream.

3. The method defined in claim 1 further comprising obtaining the icon from another file.

4. The method defined in claim 1 further comprising:
correcting DC values in the codestream.

5. The method defined in claim 4 wherein correcting the DC values in the codestream comprises correcting DC values in the codestream after the error region.

6. The method defined in claim 5 wherein correcting DC values in the codestream after the error region comprises correcting all DC values in the codestream after the error region.

7. The method defined in claim 1 further comprising filling in the error region with data from a scaled version of the icon.

8. The method defined in claim 1 wherein the image comprises a JPEG image.

9. An apparatus comprising:
means for receiving a codestream of compressed data of an image; and
means for determining a location of an error region in coefficients in the codestream using an icon, the icon being a separate and uncorrupted lower resolution version of the image as a whole.

10. The apparatus defined in claim 9 further comprising obtaining the icon from the codestream.

11. The apparatus defined in claim 9 further comprising:
means for correcting DC values in the codestream.

12. The apparatus defined in claim 11 wherein the means for correcting the DC values in the codestream comprises means for correcting DC values in the codestream after the error region.

13. The apparatus defined in claim 12 wherein the means for correcting DC values in the codestream after the error region comprises means for correcting all DC values in the codestream after the error region.

14. The apparatus defined in claim 9 further comprising means for filling in the error region with data from a scaled version of the icon.

15. An article of manufacture having one or more computer readable storage media with instructions stored thereon which, when executed by a system, cause the system to:
receive a codestream of compressed data of an image; and
determine a location of an error region in coefficients using an icon, the icon being a separate and uncorrupted lower resolution version of the image as a whole.

16. The article of manufacture defined in claim 15 wherein the instructions include instructions which when executed by the system cause the system to obtain the icon from the codestream.

17. The article of manufacture defined in claim 15 wherein the instructions include instructions which when executed by the system cause the system to correct DC values in the codestream.

18. The article of manufacture defined in claim 16 wherein the instructions to correct the DC values in the codestream comprise instructions which when executed by the system cause the system to correct DC values in the codestream after the error region.

19. The article of manufacture defined in claim 18 wherein the instructions to correct DC values in the codestream after the error region comprise instructions which when executed by the system cause the system to correct all DC values in the codestream after the error region.

20. The article of manufacture defined in claim 15 further comprising instructions to fill in the error region with data from a scaled version of the icon.

21. A method comprising:
   receiving, by the processor, a codestream of compressed data of an image; and
   correcting, by the processor, coefficients in the codestream using an icon of the image, the icon being a separate and uncorrupted lower resolution version of the image as a whole.

22. The method defined in claim 21 wherein the coefficients comprise DL values.

23. The method defined in claim 21 wherein the coefficients comprise wavelet coefficients.

24. The method defined in claim 21 wherein correcting DC values in the codestream using an icon comprises correcting DC values after an error region in coefficients.

25. The method defined in claim 21 further comprising filling in the error region with data from a scaled version of the icon.

26. The method defined in claim 21 wherein the icon is from the codestream.

27. The method defined in claim 21 wherein the DC values comprise DC values for Y, Cr and Cb.

28. An apparatus comprising:
   means for receiving a codestream of compressed data of an image; and
   means for correcting coefficients in the codestream using an icon of the image, the icon being a separate and uncorrupted lower resolution version of the image as a whole.

29. The apparatus defined in claim 28 wherein the coefficients comprise DL values.

30. The apparatus defined in claim 28 wherein the coefficients comprise wavelet coefficients.

31. The apparatus defined in claim 28 wherein the means for correcting DC values in the codestream using an icon comprises means for correcting DC values after an error region in coefficients.

32. The apparatus defined in claim 31 further comprising means for filling in the error region with data from a scaled version of the icon.

33. The apparatus defined in claim 28 wherein the icon is from the codestream.

34. An article of manufacture having one or more computer readable storage media with instructions stored thereon which, when executed by a system, cause the system to:
   receive a codestream of compressed data of an image; and
   correct coefficients in the codestream using an icon of the image, the icon being a separate and uncorrupted lower resolution version of the image as a whole.

35. The article of manufacture defined in claim 34 wherein the coefficients comprise DC values.

36. The article of manufacture defined in claim 34 wherein the coefficients comprise wavelet coefficients.

37. The article of manufacture defined in claim 34 wherein the instructions to cause the system to correct DC values in the codestream using an icon comprise instructions which when executed by the system, cause the system to correct DC values after an error region in coefficients.

38. The article of manufacture defined in claim 37 wherein the instructions include instructions which when executed by the system cause the system to fill in the error region with data from a scaled version of the icon.

39. The article of manufacture defined in claim 34 wherein the icon is from the codestream.

* * * * *

UNITED STATES PATENT AND TRADEMARK OFFICE
CERTIFICATE OF CORRECTION

PATENT NO. : 7,660,473 B2 Page 1 of 1
APPLICATION NO. : 10/286115
DATED : February 9, 2010
INVENTOR(S) : Michael J. Gormish It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Thirtieth Day of November, 2010

David J. Kappos
*Director of the United States Patent and Trademark Office*